US012567271B2

(12) United States Patent
Wang et al.

(10) Patent No.: US 12,567,271 B2
(45) Date of Patent: Mar. 3, 2026

(54) PICTURE RECOGNITION METHOD AND APPARATUS, ELECTRONIC DEVICE, AND MEDIUM

(71) Applicant: BEIJING SOGOU TECHNOLOGY DEVELOPMENT CO., LTD., Beijing (CN)

(72) Inventors: Congtao Wang, Beijing (CN); Jiajun Yang, Beijing (CN); Yuanming Wei, Beijing (CN); Wei Chen, Beijing (CN); Tao Wei, Beijing (CN); Jun Wu, Beijing (CN); Li Gong, Beijing (CN); Weiji Zhu, Beijing (CN)

(73) Assignee: BEIJING SOGOU TECHNOLOGY DEVELOPMENT CO., LTD., Beijing (CN)

( * ) Notice: Subject to any disclaimer, the term of this patent is extended or adjusted under 35 U.S.C. 154(b) by 361 days.

(21) Appl. No.: 18/137,884

(22) Filed: Apr. 21, 2023

(65) Prior Publication Data

US 2023/0290167 A1     Sep. 14, 2023

Related U.S. Application Data

(63) Continuation of application No. PCT/CN2021/103280, filed on Jun. 29, 2021.

(30) Foreign Application Priority Data

Dec. 4, 2020    (CN) .......................... 202011409602.4

(51) Int. Cl.
*G06F 40/154*     (2020.01)
*G06V 30/19*     (2022.01)
*H04L 9/32*     (2006.01)

(52) U.S. Cl.
CPC ...... *G06V 30/19073* (2022.01); *G06F 40/154* (2020.01); *H04L 9/3236* (2013.01)

(58) Field of Classification Search
CPC ................. G06V 10/82; G06V 30/155; G06V 30/18019; G06V 30/18076;
(Continued)

(56) References Cited

U.S. PATENT DOCUMENTS

| | | | |
|---|---|---|---|
| 2014/0093173 A1 | 4/2014 | Napper | |
| 2015/0043832 A1* | 2/2015 | Kubota ................. | G06V 10/98 382/229 |
| 2016/0086056 A1* | 3/2016 | Hosabettu ........... | G06V 10/761 382/161 |
| 2020/0293794 A1* | 9/2020 | Popov .................... | G06V 20/00 |

FOREIGN PATENT DOCUMENTS

| | | | | |
|---|---|---|---|---|
| CN | 1300400 A | * | 6/2001 | ......... G06V 30/2268 |
| CN | 101364267 A | * | 2/2009 | ....... G06V 30/18143 |

(Continued)

OTHER PUBLICATIONS

Ilan Ben-Bassat et al., "String Graph Construction Using Incremental Hashing", Bioinformatics, vol. 30, No. 24, Dec. 2014, 9 pgs.
Tencent Technology, WO, PCT/CN2021/103280, Sep. 29, 2021, 3 pgs.
Tencent Technology, Iprp, PCT/CN2021/103280, May 30, 2023, 4 pgs.

(Continued)

*Primary Examiner* — Huo Long Chen
(74) *Attorney, Agent, or Firm* — Morgan, Lewis & Bockius LLP

(57)     ABSTRACT

The present disclosure discloses a picture recognition method performed by a computing device. The method includes: obtaining a recognized current string and a hash value of the current string during text recognition for an acquired image through an optical character recognition model, and storing the current string and the hash value of
(Continued)

Obtain a recognized current string and a hash value of the current string during text recognition for an acquired image through an optical character recognition model, and store the current string and the hash value of the current string into a first preset tree structure — S101

Predict a new probability value of the current string at a next moment, and store the hash value of the current string into a second preset tree structure — S102

Extend the current string through a target character set recognized at the next moment, to obtain an extended string set, store a probability value and a hash value of each extended string in the extended string set into the first preset tree structure, and store the hash value of each extended string into the second preset tree structure — S103

Obtain N strings with the highest probability value from the first preset tree structure according to the hash value stored in the second preset tree structure and retain the N strings, N being an integer not less than 1; and use the N strings as current strings, repeat the foregoing steps until recognition of all acquired images is completed, and obtain a string with the highest probability value as a final recognition result — S104 the current string into a first preset tree structure and a second preset tree structure; predicting a new probability value of the current string at a next moment, to obtain an extended string set; obtaining N strings with the highest probability value according to the hash value stored in the second preset tree structure and retaining the N strings; and using the N strings as the current strings, repeating the foregoing steps until recognition of all acquired images is completed, and obtaining a string with the highest probability value as a final recognition result.

18 Claims, 4 Drawing Sheets

(58) Field of Classification Search
CPC ......... G06V 30/19173; G06V 30/1801; G06V 30/148; G06V 30/153; G06V 30/19027
See application file for complete search history.

(56) References Cited

FOREIGN PATENT DOCUMENTS

| | | | | |
|---|---|---|---|---|
| CN | 104156706 A | 11/2014 | | |
| CN | 109766893 A | 5/2019 | | |
| CN | 111079768 A | 4/2020 | | |
| CN | 111753802 A | 10/2020 | | |
| CN | 111914513 A | 11/2020 | | |
| EP | 0848536 B1 * | 7/2005 | .......... | H04M 11/066 |
| JP | 2006163830 A | 6/2006 | | |

OTHER PUBLICATIONS

Tencent Technology, ISR, PCT/CN2021/103280, Sep. 29, 2022, 2 pgs.

* cited by examiner

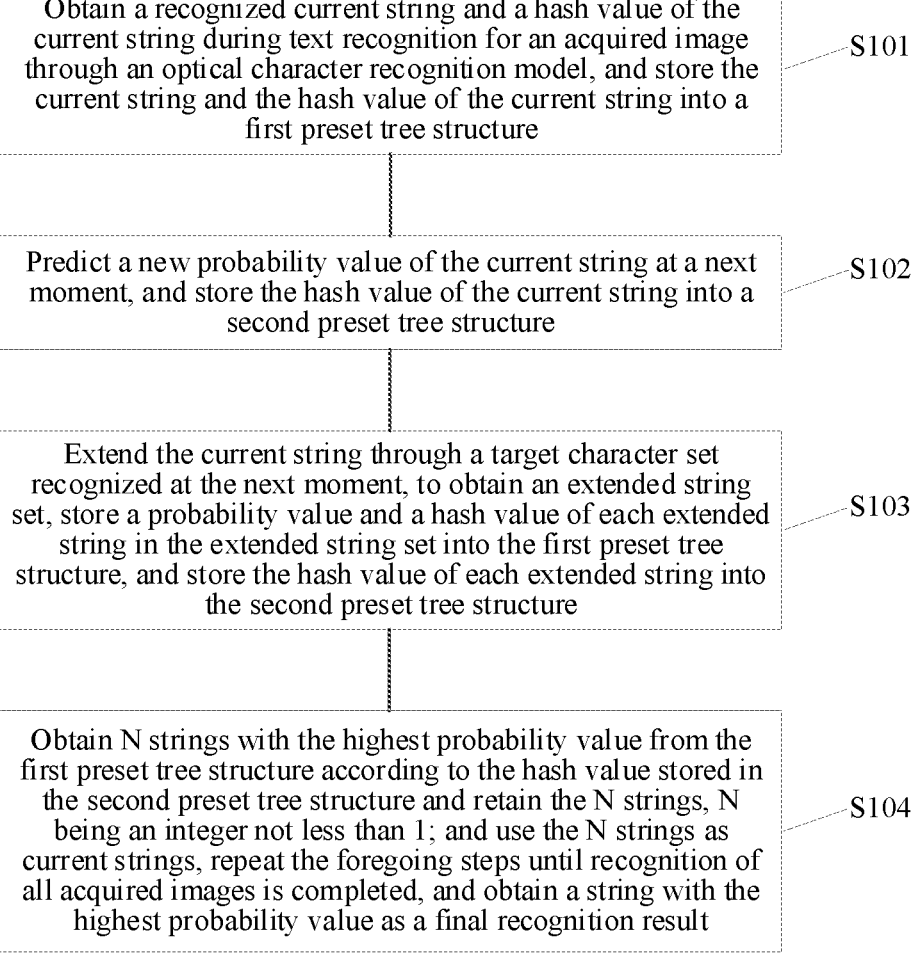

Obtain a recognized current string and a hash value of the current string during text recognition for an acquired image through an optical character recognition model, and store the current string and the hash value of the current string into a first preset tree structure —S101

Predict a new probability value of the current string at a next moment, and store the hash value of the current string into a second preset tree structure —S102

Extend the current string through a target character set recognized at the next moment, to obtain an extended string set, store a probability value and a hash value of each extended string in the extended string set into the first preset tree structure, and store the hash value of each extended string into the second preset tree structure —S103

Obtain N strings with the highest probability value from the first preset tree structure according to the hash value stored in the second preset tree structure and retain the N strings, N being an integer not less than 1; and use the N strings as current strings, repeat the foregoing steps until recognition of all acquired images is completed, and obtain a string with the highest probability value as a final recognition result —S104

FIG. 1

PICTURE RECOGNITION METHOD AND APPARATUS, ELECTRONIC DEVICE, AND MEDIUM

CROSS-REFERENCE TO RELATED APPLICATIONS

This application is a continuation application of PCT Patent Application No. PCT/CN2021/103280, entitled "PICTURE RECOGNITION METHOD AND APPARATUS, ELECTRONIC DEVICE, AND MEDIUM" filed on Jun. 29, 2021, which claims priority to Chinese Patent Application No. 202011409602.4, entitled "PICTURE RECOGNITION METHOD AND APPARATUS, ELECTRONIC DEVICE, AND MEDIUM", and filed on Dec. 4, 2020, all of which are incorporated herein by reference in their entirety.

FIELD OF THE TECHNOLOGY

The present disclosure relates to the field of image processing technologies, and in particular, to a picture recognition method and apparatus, an electronic device, and a medium.

BACKGROUND OF THE DISCLOSURE

With the rapid development of Internet technologies, users can use an image recognition apparatus, such as a dictionary pen or a point-reading pen, to translate or annotate non-mother language texts, thereby improving the learning efficiency of the users.

However, in the related art, when text recognition for images is performed, intermediate strings and corresponding probability values need to be stored. For example, strings and probability values such as a, ab, and abc need to be stored. If fields are the same, the strings and probability values need to be accumulated, and if the fields are different, the strings and probability values need to be stored together with other fields. A common method is to compare lengths of two fields first. If the lengths are different, the two fields are definitely different; and if the lengths are the same, characters are compared one by one, and if there are different characters, it indicates that the two fields are different. In this case, if a set stores n fields, and comparison of each field needs a complexity of O(n), a comparison complexity of the entire set is $O(n^2)$. Therefore, the calculation amount required for storing the intermediate strings during text recognition for images is extremely large, and the efficiency of storing the intermediate strings is low.

SUMMARY

An objective of the present disclosure is at least in part to provide a picture recognition method and apparatus, an electronic device, and a medium, which can effectively reduce the calculation amount required for storing intermediate strings during text recognition for images, and can effectively improve the efficiency of storing the intermediate strings.

A first aspect of the present disclosure provides a picture recognition method performed at a computing device, the method including: obtaining a recognized current string and a hash value of the current string during text recognition for an acquired image through an optical character recognition model, and storing the current string and the hash value of the current string into a first preset tree structure; predicting a new probability value of the current string at a next moment, and storing the hash value of the current string into a second preset tree structure; extending the current string through a target character set recognized at the next moment, to obtain an extended string set, storing a probability value and a hash value of each extended string in the extended string set into the first preset tree structure, and storing the hash value of each extended string into the second preset tree structure; and obtaining N strings with the highest probability value from the first preset tree structure according to the hash value stored in the second preset tree structure and retaining the N strings, N being an integer not less than 1; and using the N strings as current strings, repeating the foregoing steps until recognition of all acquired images is completed, and obtaining a string with the highest probability value as a final recognition result.

In some embodiments, the obtaining a recognized current string and a hash value of the current string during text recognition for an acquired image through an optical character recognition model includes: obtaining the current string formed by characters whose recognition probability is greater than a preset probability, and obtaining the hash value of the current string during the text recognition for the acquired image through the optical character recognition model.

In some embodiments, the predicting a new probability value of the current string at a next moment, and storing the hash value of the current string into a second preset tree structure includes: predicting a predicted character of the current string at the next moment; and obtaining a combined probability of the current string and the predicted character as the new probability value, and storing the hash value of the current string into the second preset tree structure, where the second preset tree structure is a set structure.

In some embodiments, the extending the current string through a target character set recognized at the next moment, to obtain an extended string set includes: obtaining characters whose recognition probability is greater than the preset probability and recognized at the next moment to form the target character set; and combining the current string with each character in the target character set to obtain all combined strings as the extended string set.

In some embodiments, the obtaining N strings with the highest probability value from the first preset tree structure according to the hash value stored in the second preset tree structure and retaining the N strings includes: determining N hash values with the highest probability value from the second preset tree structure according to the new probability value of the current string and the probability value of each extended string; and determining the N strings corresponding to the N hash values from the first preset tree structure according to the N hash values.

In some embodiments, the first preset tree structure is a set structure.

A second aspect of the present disclosure provides a picture recognition apparatus, including: a character recognition unit, configured to obtain a recognized current string and a hash value of the current string during text recognition for an acquired image through an optical character recognition model, and store the current string and the hash value of the current string into a first preset tree structure; a prediction unit, configured to predict a new probability value of the current string at a next moment and store the hash value of the current string into a second preset tree structure; an extension unit, configured to extend the current string through a target character set recognized at the next moment, to obtain an extended string set, store a probability value and a hash value of each extended string in the extended string set into the first preset tree structure, and store the hash value of each extended string into the second preset tree structure; and a loop execution unit, configured to obtain N strings with the highest probability value from the first preset tree structure according to the hash value stored in the second preset tree structure and retain the N strings, N being an integer not less than 1; and use the N strings as current strings, repeat the foregoing steps until recognition of all acquired images is completed, and obtain a string with the highest probability value as a final recognition result.

In some embodiments, the character recognition unit is configured to obtain the current string formed by characters whose recognition probability is greater than a preset probability, and obtain the hash value of the current string during the text recognition for the acquired image through the optical character recognition model.

In some embodiments, the prediction unit is configured to predict a predicted character of the current string at the next moment; and obtain a combined probability of the current string and the predicted character as the new probability value, and store the hash value of the current string into the second preset tree structure, where the second preset tree structure is a set structure.

In some embodiments, the extension unit is configured to obtain characters whose recognition probability is greater than the preset probability and recognized at the next moment to form the target character set; and combine the current string with each character in the target character set to obtain all combined strings as the extended string set.

In some embodiments, the loop execution unit is configured to determine N hash values with the highest probability value from the second preset tree structure according to the new probability value of the current string and the probability value of each extended string; and determine the N strings corresponding to the N hash values from the first preset tree structure according to the N hash values.

In some embodiments, the first preset tree structure is a set structure.

A third aspect of the present disclosure provides an apparatus for processing data, including a memory and one or more programs, the one or more programs being stored in the memory, and configured to perform the steps of the foregoing picture recognition method included in the one or more programs by one or more processors.

A fourth aspect of the present disclosure provides a non-transitory machine-readable medium, storing instructions, the instructions, when executed by one or more processors, causing an apparatus to perform the steps of the foregoing picture recognition method.

According to the foregoing technical solutions, during text recognition for the image through the OCR model, when it is determined that a certain string needs to be stored, hash values of to-be-stored N characters are first determined through a mapping relationship between probability values and hash values, and then the to-be-stored N characters are determined according to a mapping relationship between hash values and strings and the hash values of the N characters. Compared with the related art, there is no need to compare lengths of stored fields, or store the fields after characters are compared one by one when the lengths of the fields are the same. The present application adopts the mapping relationships between the probability values, the hash values, and the strings, so that the to-be-stored string can be determined only by storing the hash value, which can greatly reduce the calculation amount required for storing the strings, and can effectively improve the efficiency of storing the strings; and on the basis of improving the efficiency of storing the strings, because the stored strings are used for text recognition, the efficiency of text recognition through the OCR model is also improved accordingly.

BRIEF DESCRIPTION OF THE DRAWINGS

FIG. 1 is a method flowchart of a picture recognition method according to one or more embodiments of the present disclosure.

DESCRIPTION OF EMBODIMENTS

Figure 2:
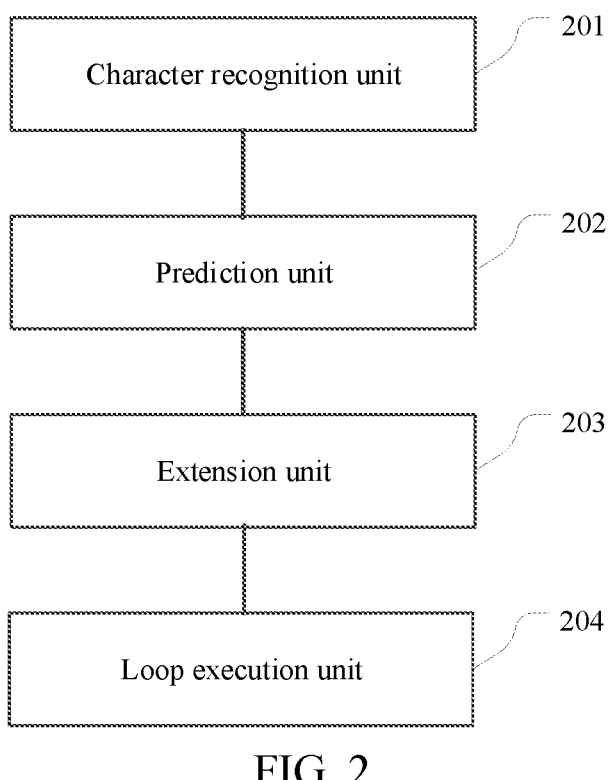
FIG. 2 is a schematic structural diagram of a picture recognition apparatus according to one or more embodiments of the present disclosure.

To better understand the foregoing technical solutions, the technical solutions of the embodiments of the present disclosure are described in detail below through the accompanying drawings and specific embodiments. It should be understood that the embodiments of the present disclosure and the specific features in the embodiments are detailed description of the technical solutions of the embodiments of the present disclosure instead of limitations on the technical solutions of the present disclosure. The embodiments of the present disclosure and the technical features in the embodiments can be combined with each other in the case of no conflict.

For the technical problem of a low efficiency of storing intermediate strings during text recognition for images, the present disclosure provides a picture recognition scheme. The scheme is used to obtain a recognized current string and a hash value of the current string during text recognition for an acquired image through an optical character recognition model, and store the current string and the hash value of the current string into a first preset tree structure; predict a new probability value of the current string at a next moment, and store the hash value of the current string into a second preset tree structure; extend the current string through a target character set recognized at the next moment, to obtain an extended string set, store a probability value and a hash value of each extended string in the extended string set into the first preset tree structure, and store the hash value of each extended string into the second preset tree structure; and obtain N strings with the highest probability value from the first preset tree structure according to the hash value stored in the second preset tree structure and retain the N strings, N being an integer not less than 1; and use the N strings as current strings, repeat the foregoing steps until recognition of all acquired images is completed, and obtain a string with the highest probability value as a final recognition result.

In this way, during text recognition for the image through the OCR model, when it is determined that a certain string needs to be stored, hash values of to-be-stored N characters are first determined through a mapping relationship between probability values and hash values, and then the to-be-stored N characters are determined according to a mapping relationship between hash values and strings and the hash values of the N characters. Compared with the related art, there is no need to compare lengths of stored fields, or store the fields after characters are compared one by one when the lengths of the fields are the same. The present application adopts the mapping relationships between the probability values, the hash values, and the strings, so that the to-be-stored string can be determined only by storing the hash value, which can greatly reduce the calculation amount required for storing the strings, and can effectively improve the efficiency of storing the strings; and on the basis of improving the efficiency of storing the strings, because the stored strings are used for text recognition, the efficiency of text recognition through the OCR model is also improved accordingly.

According to some embodiments of the present disclosure, in the field of image text recognition, an optical character recognition (OCR) model is usually used to recognize texts in an image, and when the OCR model is used to recognize the texts in the image, the OCR model needs to be used to predict a probability of each character to perform beam search decoding, so that the texts in the image can be predicted through the OCR model.

According to some embodiments of the present disclosure, the characters may be texts, punctuations, and symbols, which are not specifically limited in this specification.

As shown in FIG. 1, the present disclosure provides a picture recognition method, and the method includes the following steps:

S101. Obtain a recognized current string and a hash value of the current string during text recognition for an acquired image through an optical character recognition model, and store the current string and the hash value of the current string into a first preset tree structure.

S102. Predict a new probability value of the current string at a next moment, and store the hash value of the current string into a second preset tree structure.

S103. Extend the current string through a target character set recognized at the next moment, to obtain an extended string set, store a probability value and a hash value of each extended string in the extended string set into the first preset tree structure, and store the hash value of each extended string into the second preset tree structure.

S104. Obtain N strings with the highest probability value from the first preset tree structure according to the hash value stored in the second preset tree structure and retain the N strings, N being an integer not less than 1; and use the N strings as current strings, repeat the foregoing steps until recognition of all acquired images is completed, and obtain a string with the highest probability value as a final recognition result.

According to some embodiments of the present disclosure, the OCR model is usually deployed on an image recognition apparatus. The image recognition apparatus may be served by a server. The image recognition apparatus may be, for example, a dictionary pen or point-reading pen, and the server may be, for example, a notebook computer, a desktop computer, or an all-in-one computer.

According to some embodiments of the present disclosure, in step S101, during the text recognition for the acquired image through the OCR model, a current string is predicted through the OCR model, and a hash algorithm is used to hash the predicted current string to obtain a hash value of the current string. The hash algorithm may be, for example, MD5, SHA-1, or SHA-2, which is not specifically limited in this specification.

According to some embodiments of the present disclosure, the current string formed by characters whose recognition probability is greater than a preset probability is obtained, and the hash value of the current string is obtained during the text recognition for the acquired image through the optical character recognition model, and then the current string and the hash value of the current string are stored into the first preset tree structure.

According to some embodiments of the present disclosure, when the current string is predicted through the OCR model, a preset probability may be preset, and then each character in an image predicted through the OCR model at the current moment is filtered according to the preset probability, so that the current string is obtained by filtering through the preset probability, where a probability of each character in the current string is greater than the preset probability; a hash algorithm is used to hash the current string obtained by filtering to obtain the hash value of the current string, and the current string and the hash value of the current string are stored into the first preset tree structure, where the first preset tree structure may be a set structure in C language or a binary-tree structure, which is not specifically limited in this specification.

For example, taking texts as an example, a continuous picture set is obtained during continuously scanning of the texts through an image scanning apparatus; and then an OCR model is used to recognize the picture set. During recognition, if a probability of a word in the picture recognized at the current moment is 15% for A1, 35% for A2, 65% for A3, 85% for A4, and 45% for A5, and a preset probability is 50%, A1, A2 and A5 are filtered out, A3 and A4 are retained, and the current string is determined to be A3 and A4; if the preset probability is 70%, the current string is determined to be A4; and after the current string is obtained as A4, A4 is hashed by SHA-2, an obtained hash value H1 is used as a hash value of A4, and then A4 and H1 are stored into the first set structure.

After the current string and the hash value are stored into the first preset tree structure, step S102 is performed. In the step, a new probability value of the current string at a next moment is predicted, and the hash value of the current string is stored into a second preset tree structure.

According to some embodiments of the present disclosure, a predicted character of the current string at the next moment is predicted; and a combined probability of the current string and the predicted character is obtained as the new probability value, and the hash value of the current string is stored into the second preset tree structure, where the second preset tree structure may be a set structure and binary-tree structure.

According to some embodiments of the present disclosure, when the predicted character of the current string at the next moment is predicted, the last character in the current string may be used as the predicted character, or a space may be used as the predicted character, so that the predicted character may include any one or more of the last character and the space in the current string. When there are a plurality of predicted characters, obtaining a combined probability of the current string and the predicted character is obtaining a sum of combined probabilities of the current character and each predicted character as a new probability value, or a sum of weights of combined probabilities as a new probability value, or a product of combined probabilities as a new probability value, which is not specifically limited in this specification.

According to some embodiments of the present disclosure, after a sum of new probability values is obtained, a current string is stored separately into the second preset tree structure, where there are no duplicate numbers in the second preset tree structure and accordingly, no duplicate numbers in the first preset tree structure.

For example, assuming that a current string is abc at a moment T−1, the current string is predicted to be abc+space and abc+c at a moment T. If a probability value of abc+space is predicted to be H2 by the OCR model, and a probability value of abc+c is predicted to be H3, a new probability value of abc is determined to be H2+H3, and a hash value X of abc is stored into the second set structure.

Next, step S103 is performed. In the step, the current string is extended through a target character set recognized at the next moment, to obtain an extended string set, a probability value and a hash value of each extended string in the extended string set are stored into the first preset tree structure, and the hash value of each extended string is stored into the second preset tree structure.

According to some embodiments of the present disclosure, characters whose recognition probability is greater than a preset probability and recognized at the next moment are obtained to form the target character set; and the current string is combined with each character in the target character set to obtain all combined strings as the extended string set.

According to some embodiments of the present disclosure, text recognition is performed on an image acquired at a next moment through the OCR model. Each character in an image predicted through the OCR model at the next moment is filtered according to the preset probability, to obtain all words whose recognition probability is greater than the preset probability to form a target character set, and then the current string is combined with each character in the target character set to obtain all combined strings as an extended string set.

For example, also taking a current string abc as an example, if an image acquired at a moment T+1 is recognized through the OCR model, and characters whose recognition probability is greater than the preset probability are recognized as d, e and f, abcd, abce, and abcf are obtained as extended string sets, then probability values of abcd, abce, and abcf are predicted as D1, D2 and D3 in sequence through the OCR model, and abcd, abce, and abcf are hashed by a hash algorithm, where the obtained hash values are X1, X2, and X3 in sequence. In this way, abcd and X1, abce and X2, and abcf and X3 are stored into the first set structure, and X1, X2, and X3 are stored into the second set structure.

After the probability value and the hash value of each extended string in the extended string set are stored into the first preset tree structure, and the hash value of each extended string is stored into the second preset tree structure, step S104 is performed.

In step S104, N hash values with the highest probability value may be determined from the second preset tree structure according to the new probability value of the current string and the probability value of each extended string; N strings corresponding to the N hash values are determined from the first preset tree structure according to the N hash values; the N strings are retained, where N is an integer not less than 1; and the N strings are used as current strings, the foregoing steps are repeated until recognition of all acquired images is completed, and a string with the highest probability value is obtained from the first preset tree structure as a final recognition result.

According to some embodiments of the present disclosure, a value of N may be a maximum set number in beam search in the OCR model, or may be set manually or by a device, for example, the value of N may be 1, 2, 3, or 5, which is not specifically limited in this specification.

For example, also taking a current string abc as an example, an extended string sets at a moment T+1 are obtained as abcd, abce, and abcf, corresponding probability values are D1, D2, and D3, and the new probability value of abc is obtained as H2+H3. If D2>D3>D1>(H2+H3) and N=2, hash values of the N strings may be obtained from the second set structure as X2 and X3 according to a mapping relationship between probability values and hash values; and a string corresponding to X2 is obtained as abce and a string corresponding to X3 is obtained as abcf from the first set structure according to X2 and X3, and the N strings are determined as abce and abcf. In this case, abce and abcf in the first set structure are retained as the current strings, and only hash values X2 and X3 corresponding to abce and abcf may be retained in the second set structure; and then the next step of processing is performed.

According to some embodiments of the present disclosure, first, new probabilities of N strings at a moment T+2 need to be predicted. Specifically, it is predicted that the new probability of abce at the moment T+2 is a sum of probabilities of abce+space and abce+e; and the new probability of abcf at the moment T+2 is a sum of probabilities of abcf+space and abcf+f. If the moment T+2 is used as the current moment, an acquired real-time picture is recognized through the OCR model, and characters whose recognition probability is greater than the preset probability are recognized as p and k, abcep, abcek, abcfp, and abcfk are obtained as extended string sets, then probability values of abcep, abcek, abcfp, and abcfk are predicted through the OCR model as D4, D5, D6, and D7 in sequence, and abcep, abcek, abcfp, and abcfk are hashed by the hash algorithm, where the obtained hash values are X4, X5, X6, and X7 in sequence. In this way, abcep and X4, abcek and X5, abcfp and X6, and abcfk and X7 are stored into the first set structure, and X4, X5, X6, and X7 are stored into the second set structure.

According to some embodiments of the present disclosure, if a new probability of D5>D4>D7>D6>abce is greater than that of abcf, N strings are determined as abcek and abcep according to mapping relationships between probability values, hash values, and strings. In this case, abce and abcf in the first set structure are used as the current strings and retained, and only hash values X2 and X3 corresponding to abce and abcf may be retained in the second set structure; and then next step of processing is performed in the same way until a recognition of all acquired images is completed, and a string with the highest probability value is obtained as a final recognition result.

In this way, in the embodiments of this specification, during recognition for the current string is recognized, only strings whose recognition probability is greater than the preset probability are retained, and strings whose recognition probability is not greater than the preset probability are discarded, thereby improving the recognition efficiency of the OCR model as a whole.

When it is determined that a certain string needs to be stored, hash values of to-be-stored N characters are first determined through a mapping relationship between probability values and hash values, and then the to-be-stored N characters are determined according to a mapping relationship between hash values and strings and the hash values of the N characters. Compared with the related art, there is no need to compare lengths of stored fields, or store the fields after characters are compared one by one when the lengths of the fields are the same. The present application adopts the mapping relationships between the probability values, the hash values, and the strings, so that the to-be-stored string can be determined only by storing the hash value, which can greatly reduce the calculation amount required for storing the strings, and can effectively improve the efficiency of storing the strings; and on the basis of improving the efficiency of storing the strings, because the stored strings are used for text recognition, the efficiency of text recognition through the OCR model is also improved accordingly.

As shown in FIG. 2, the present disclosure further provides a picture recognition apparatus, including:

a character recognition unit 201 is configured to obtain a recognized current string and a hash value of the current string during text recognition for an acquired image through an optical character recognition model, and store the current string and the hash value of the current string into a first preset tree structure;

a prediction unit 202 is configured to predict a new probability value of the current string at a next moment and store the hash value of the current string into a second preset tree structure;

an extension unit 203 is configured to extend the current string through a target character set recognized at the next moment, to obtain an extended string set, store a probability value and a hash value of each extended string in the extended string set into the first preset tree structure, and store the hash value of each extended string into the second preset tree structure; and a loop execution unit 204 is configured to obtain N strings with the highest probability value from the first preset tree structure according to the hash value stored in the second preset tree structure and retain the N strings, N being an integer not less than 1; and use the N strings as current strings, repeat the foregoing steps until recognition of all acquired images is completed, and obtain a string with the highest probability value as a final recognition result.

In some embodiments, the character recognition unit 201 is configured to obtain the current string formed by characters whose recognition probability is greater than a preset probability, and obtain the hash value of the current string during the text recognition for the acquired image through the optical character recognition model.

In some embodiments, the prediction unit 202 is configured to predict a predicted character of the current string at the next moment; and obtain a combined probability of the current string and the predicted character as the new probability value, and store the hash value of the current string into the second preset tree structure, where the second preset tree structure is a set structure.

In some embodiments, the extension unit 203 is configured to obtain characters whose recognition probability is greater than the preset probability and recognized at the next moment to form the target character set; and combine the current string with each character in the target character set to obtain all combined strings as the extended string set.

In some embodiments, the loop execution unit 204 is configured to determine N hash values with the highest probability value from the second preset tree structure according to the new probability value of the current string and the probability value of each extended string; and determine the N strings corresponding to the N hash values from the first preset tree structure according to the N hash values.

In some embodiments, the first preset tree structure is a set structure.

Figure 3:
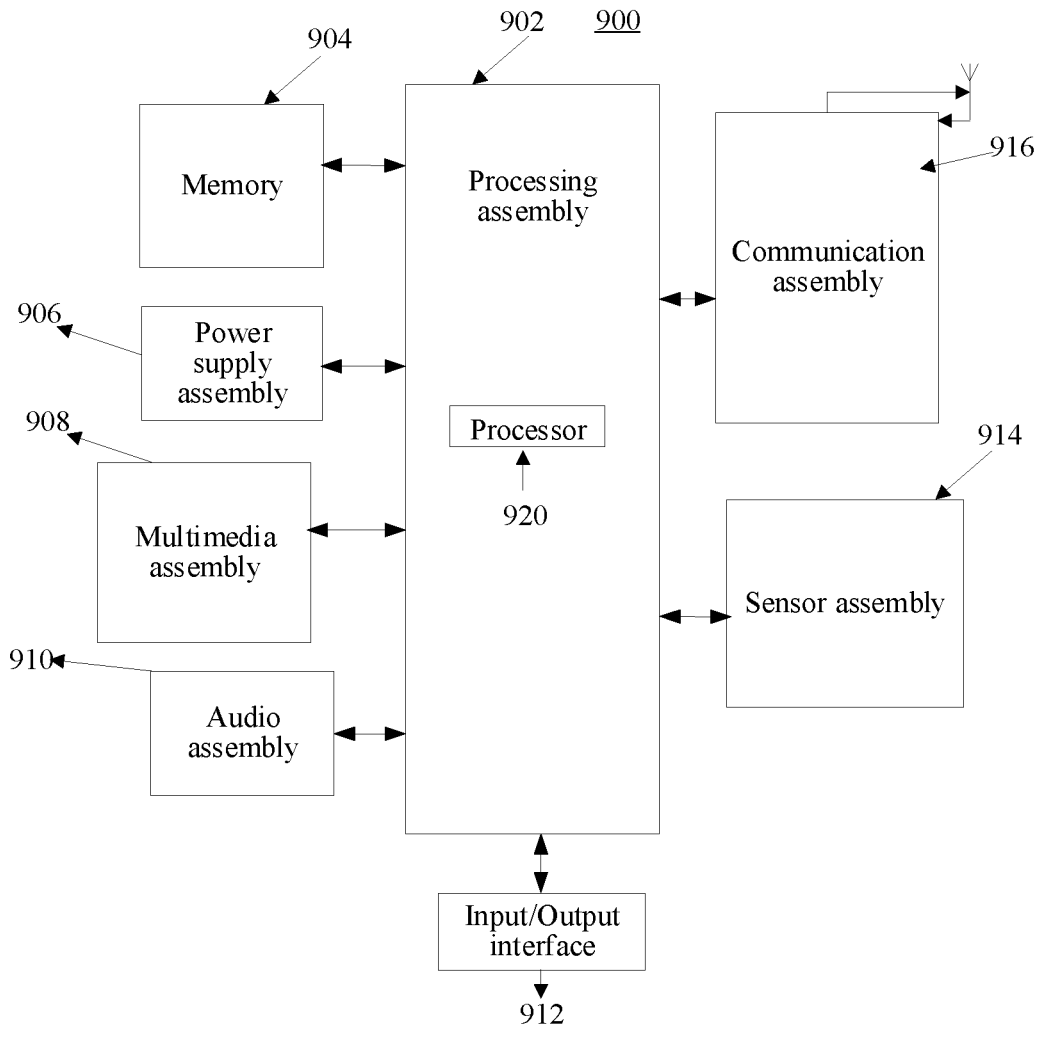
FIG. 3 is a schematic block diagram of a picture recognition apparatus as a device according to one or more embodiments of the present disclosure.

FIG. 3 is a schematic block diagram of a picture recognition apparatus as a device according to an embodiment of the present disclosure. For example, an apparatus 900 may be a mobile phone, a computer, a digital broadcasting terminal, a messaging transceiver, a game console, a tablet device, a medical device, a fitness facility, a personal digital assistant, or the like.

Referring to FIG. 3, the apparatus 900 may include one or more of the following assemblies: a processing assembly 902, a memory 904, a power supply assembly 906, a multimedia assembly 908, an audio assembly 910, an input/output (I/O) interface 912, a sensor assembly 914, and a communication assembly 916.

The processing assembly 902 usually controls overall operations of the apparatus 900, such as operations associated with displaying, a phone call, data communication, a camera operation, and a recording operation. The processing assembly 902 may include one or more processors 920 to perform instructions, to complete all or some steps of the foregoing method. In addition, the processing assembly 902 may include one or more modules, to facilitate the interaction between the processing assembly 902 and other assemblies. For example, the processing assembly 902 may include a multimedia module, to facilitate the interaction between the multimedia assembly 908 and the processing assembly 902.

The memory 904 is configured to store data of various types to support operations on the apparatus 900. Examples of the data include instructions of any application program or method that are configured to be operated on the apparatus 900, such as contact data, address book data, a message, a picture, and a video. The memory 904 can be implemented by any type of volatile or non-volatile storage devices or a combination thereof, such as a static random access memory (SRAM), an electrically erasable programmable read-only memory (EPROM), a programmable read-only memory (PROM), a read-only memory (ROM), a magnetic memory, a flash memory, a magnetic disc, or an optical disc.

The power supply assembly 906 provides power to various assemblies of the apparatus 900. The power supply assembly 906 may include a power supply management system, one or more power supplies, and other assemblies associated with generating, managing and allocating power for the apparatus 900.

The multimedia assembly 908 includes a screen providing an output interface between the apparatus 900 and a user. In some embodiments, the screen may include a liquid crystal display (LCD) and a touch panel (TP). If the screen includes a TP, the screen may be implemented as a touchscreen, to receive an input signal from the user. The TP includes one or more touch sensors to sense touching, sliding, and gestures on the TP. The touch sensor may not only sense the boundary of touching or sliding operations, but also detect duration and pressure related to the touching or sliding operations. In some embodiments, the multimedia assembly 908 includes a front-facing camera and/or a rear-facing camera. When the apparatus 900 is in an operation mode, such as a shooting mode or a video mode, the front-facing camera and/or the rear-facing camera may receive external multimedia data. Each front-facing camera and rear-facing camera may be a fixed optical lens system or have a focal length and an optical zooming capability.

The audio assembly 910 is configured to output and/or input an audio signal. For example, the audio assembly 910 includes a microphone (MIC), and when the apparatus 900 is in an operation mode, such as a call mode, a recording mode, and a voice identification mode, the MIC is configured to receive an external audio signal. The received audio signal may be further stored in the memory 904 or transmitted through the communication assembly 916. In some embodiments, the audio assembly 910 further includes a loudspeaker, configured to output an audio signal.

The I/O interface 912 provides an interface between the processing assembly 902 and an external interface module. The external interface module may be a keyboard, a click wheel, buttons, or the like. The buttons may include, but not limited to: a homepage button, a volume button, a start-up button, and a locking button.

The sensor assembly 914 includes one or more sensors, configured to provide state evaluation in each aspect to the apparatus 900. For example, the sensor assembly 914 may detect an opened/closed status of the apparatus 900, and relative positioning of the assembly. For example, the assembly is a display and a small keyboard of the apparatus 900. The sensor assembly 914 may further detect a position change of the apparatus 900 or one assembly of the apparatus 900, an existence or nonexistence of contact between the user and the apparatus 900, an azimuth or acceleration/deceleration of the apparatus 900, and a temperature change of the apparatus 900. The sensor assembly 914 may include a proximity sensor, configured to detect the existence of nearby objects without any physical contact. The sensor assembly 914 may further include an optical sensor, such as a CMOS or CCD image sensor, configured to be used in an imaging application. In some embodiments, the sensor assembly 914 may further include an acceleration sensor, a gyroscope sensor, a magnetic sensor, a pressure sensor, or a temperature sensor.

The communication assembly 916 is configured to facilitate communication in a wired or wireless manner between the apparatus 900 and other devices. The apparatus 900 may access a wireless network based on communication standards, such as Wi-Fi, 2G, or 3G, or a combination thereof. In an exemplary embodiment, the communication assembly 916 receives a broadcast signal or broadcast related information from an external broadcast management system through a broadcast channel. In an exemplary embodiment, the communication assembly 916 further includes a near field communication (NFC) module, to promote short range communication. For example, the NFC module may be implemented based on a radio frequency identification (RFID) technology, an infra-red data association (IrDA) technology, an ultra wideband (UWB) technology, a Bluetooth (BT) technology, and other technologies.

In some embodiments, the apparatus 900 can be implemented as one or more application specific integrated circuit (ASIC), a digital signal processor (DSP), a digital signal processing device (DSPD), a programmable logic device (PLD), a field programmable gate array (FPGA), a controller, a micro-controller, a microprocessor or other electronic element, so as to perform the foregoing method.

In some embodiments, a non-transitory computer readable storage medium including instructions, for example, a memory 904 including instructions, is further provided, and the foregoing instructions may be performed by a processor 920 of the apparatus 900 to complete the foregoing method. For example, the non-transitory computer readable storage medium may be a ROM, a random access memory (RAM), a CD-ROM, a magnetic tape, a floppy disk, an optical data storage device, or the like.

Figure 4:
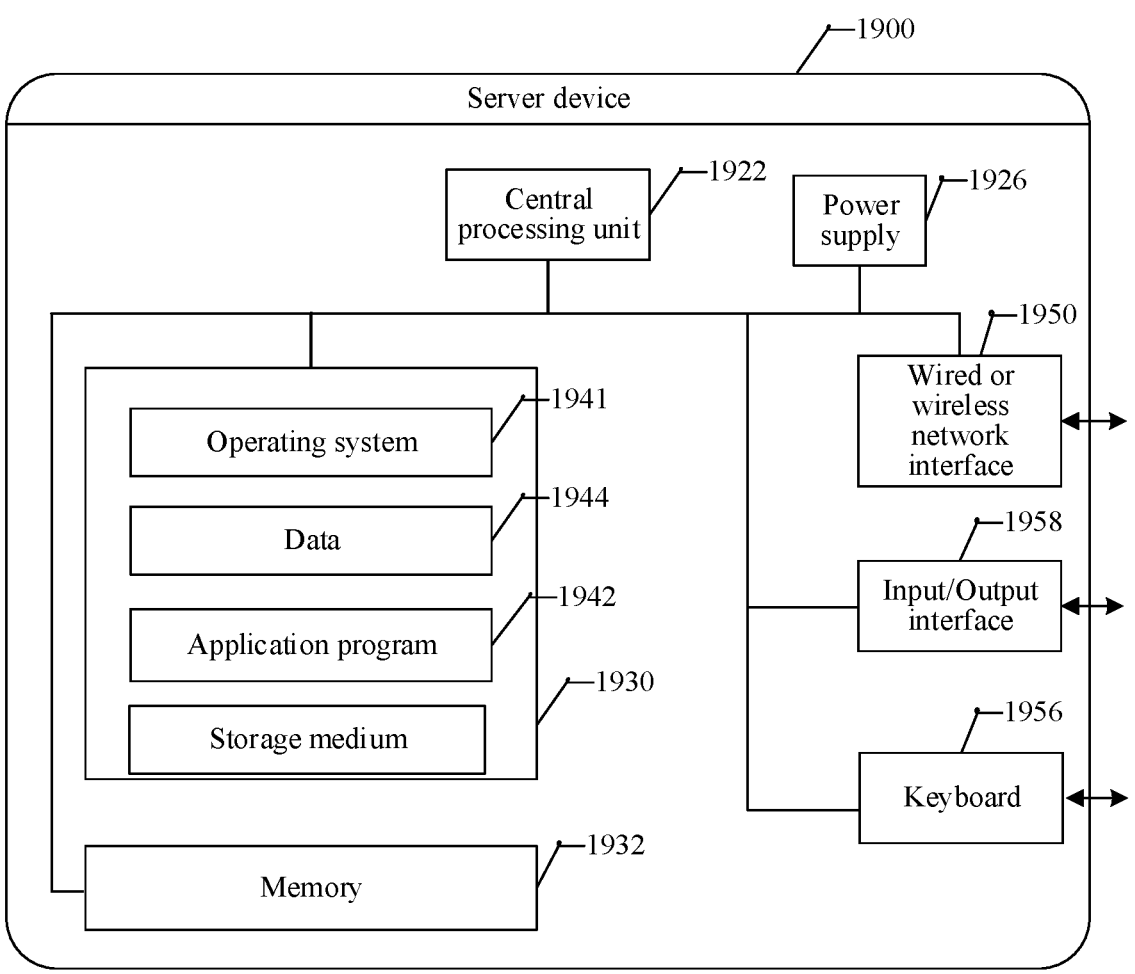
FIG. 4 is a structural block diagram of a server according to one or more embodiments of the present disclosure.

FIG. 4 is a structural block diagram of a server according to some embodiments of the present disclosure. The server 1900 may vary greatly due different configurations or performance, and may include one or more central processing units (CPU) 1922 (for example, one or more processors) and a memory 1932, and one or more storage media 1930 (for example, one or more mass storage devices) that store application programs 1942 or data 1944. The memory 1932 and the storage medium 1930 may be transient or persistent storages. A program stored in the storage medium 1930 may include one or more modules (not shown in the figure), and each module may include a series of instruction operations for the server. Further, the central processing unit 1922 may be set to communicate with the storage medium 1930, and perform, on the server 1900, the series of instruction operations stored in the storage medium 1930.

The server 1900 may further include one or more power supplies 1926, one or more wired or wireless network interfaces 1950, one or more input/output interfaces 1958, one or more keyboards 1956, and/or, one or more operating systems 1941, for example, Windows Server™, Mac OS X™, Unix™, Linux™, and FreeBSD™.

When the instructions in the storage medium are executed by a processor of an apparatus (device or sever), the non-transitory computer-readable storage medium enables the apparatus to perform a picture recognition method, and the method includes: obtaining a recognized current string and a hash value of the current string during text recognition for an acquired image through an optical character recognition model, and storing the current string and the hash value of the current string into a first preset tree structure; predicting a new probability value of the current string at a next moment, and storing the hash value of the current string into a second preset tree structure; extending the current string through a target character set recognized at the next moment, to obtain an extended string set, storing a probability value and a hash value of each extended string in the extended string set into the first preset tree structure, and storing the hash value of each extended string into the second preset tree structure; and obtaining N strings with the highest probability value from the first preset tree structure according to the hash value stored in the second preset tree structure and retaining the N strings, N being an integer not less than 1; and using the N strings as current strings, repeating the foregoing steps until recognition of all acquired images is completed, and obtaining a string with the highest probability value as a final recognition result.

The present application is described with reference to the flowcharts and/or block diagrams of the method, the device (system), and the computer program product according to the present disclosure. It should be understood that, computer program instructions can implement each procedure and/or block in the flowcharts and/or block diagrams, and a combination of procedures and/or blocks in the flowcharts and/or block diagrams. These computer program instructions may be provided for a general-purpose computer, a special-purpose computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction device. The instruction device implements a specific function in one or more processes in the flowcharts and/or in one or more blocks in the block diagrams.

These computer program instructions may further be loaded onto a computer or another programmable data processing device, so that a series of operations and steps are performed on the computer or the another programmable device, thereby generating computer-implemented processing. Therefore, the instructions performed on the computer or the another programmable device provide steps for implementing a specific function in one or more processes in the flowcharts and/or in one or more blocks in the block diagrams.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. Although preferred embodiments of the present application have been described, once a person skilled in the art learns of the basic creative concept, additional changes and modifications may be made to these embodiments. Therefore, the following claims are intended to be construed as to cover the preferred embodiments and all changes and modifications falling within the scope of the present application.

Apparently, a person skilled in the art may make various modifications and variations to the present application without departing from the spirit and scope of the present application. In this way, if the modifications and variations of the present application fall within the scope of the claims of the present application and equivalent technologies thereof, the present application also intends to include the modifications and variations.

What is claimed is:

1. A picture recognition method comprising:

at a computing device that has at least one processor and a non-transitory computer-readable medium:

while recognizing text for an acquired image through an optical character recognition model:

obtaining, based on the acquired image, a current string using the optical character recognition model;

computing a hash value of the current string;

storing the current string and the hash value of the current string into a first preset tree structure;

predicting a new probability value of the current string at a next moment;

storing the hash value of the current string into a second preset tree structure;

generating, based on the current string, a target character set using the optical character recognition model at the next moment;

extending the current string through the target character set recognized at the next moment, to obtain an extended string set;

for each extended string in the extended string set:

computing a respective probability value and a respective hash value; and storing the respective probability value and the respective hash value into the second preset tree structure;

selecting N strings with one or more highest probability values from the first preset tree structure according to the hash values stored in the second preset tree structure, N being an integer not less than 1; and using the N strings as current strings, repeating the foregoing steps to obtain a target string with a highest probability value as a final recognition result.

2. The method according to claim 1, wherein:

the obtaining a current string comprises obtaining the current string formed by characters whose recognition probability is greater than a preset probability; and the computing a hash value of the current string comprises obtaining the hash value of the current string while recognizing text for the acquired image through the optical character recognition model.

3. The method according to claim 2, wherein the predicting a new probability value of the current string at a next moment, and storing the hash value of the current string into a second preset tree structure comprises:

predicting a predicted character of the current string at the next moment;

obtaining a combined probability of the current string and the predicted character as the new probability value; and storing the hash value of the current string into the second preset tree structure, wherein the second preset tree structure is a set structure.

4. The method according to claim 1, wherein the extending the current string through the target character set to obtain an extended string set comprises:

obtaining characters whose recognition probability is greater than a preset probability and recognized at the next moment to form the target character set; and combining the current string with each character in the target character set to obtain all combined strings as the extended string set.

5. The method according to claim 4, wherein the selecting N strings with one or more highest probability values from the first preset tree structure according to the hash values stored in the second preset tree structure comprises:

determining N hash values with one or more highest probability values from the second preset tree structure according to the new probability value of the current string and the respective probability value of each extended string; and determining the N strings corresponding to the N hash values from the first preset tree structure according to the N hash values.

6. The method according to claim 1, wherein the first preset tree structure is a set structure.

7. A computing device, comprising a processor and a memory, the memory storing instructions that, when executed by the processor, cause the computing device to perform a picture recognition method including:

while recognizing text for an acquired image through an optical character recognition model:

obtaining, based on the acquired image, a current string using the optical character recognition model;

computing a hash value of the current string;

storing the current string and the hash value of the current string into a first preset tree structure;

predicting a new probability value of the current string at a next moment;

storing the hash value of the current string into a second preset tree structure;

generating, based on the current string, a target character set using the optical character recognition model at the next moment;

extending the current string through the target character set to obtain an extended string set;

for each extended string in the extended string set:

computing a respective probability value and a respective hash value; and storing the respective probability value and the respective hash value into the second preset tree structure;

selecting N strings with one or more highest probability values from the first preset tree structure according to the hash values stored in the second preset tree structure, N being an integer not less than 1; and using the N strings as current strings, repeating the foregoing steps to obtain a target string with a highest probability value as a final recognition result.

8. The computing device according to claim 7, wherein:

the obtaining a current string comprises obtaining the current string formed by characters whose recognition probability is greater than a preset probability; and the computing a hash value of the current string comprises obtaining the hash value of the current string while recognizing text for the acquired image through the optical character recognition model.

9. The computing device according to claim 8, wherein the predicting a new probability value of the current string at a next moment, and storing the hash value of the current string into a second preset tree structure comprises:

predicting a predicted character of the current string at the next moment;

obtaining a combined probability of the current string and the predicted character as the new probability value; and storing the hash value of the current string into the second preset tree structure, wherein the second preset tree structure is a set structure.

10. The computing device according to claim 7, wherein the extending the current string through the target character set to obtain an extended string set comprises:

obtaining characters whose recognition probability is greater than a preset probability and recognized at the next moment to form the target character set; and combining the current string with each character in the target character set to obtain all combined strings as the extended string set.

11. The computing device according to claim 10, wherein the selecting N strings with one or more highest probability values from the first preset tree structure according to the hash values stored in the second preset tree structure comprises:

determining N hash values with one or more highest probability values from the second preset tree structure according to the new probability value of the current string and the respective probability value of each extended string; and determining the N strings corresponding to the N hash values from the first preset tree structure according to the N hash values.

12. The computing device according to claim 7, wherein the first preset tree structure is a set structure.

13. A non-transitory computer-readable storage medium, comprising instructions that, when executed by a processor of a computing device, cause the computing device to perform a picture recognition method including:

while recognizing text for an acquired image through an optical character recognition model:

obtaining, based on the acquired image, a current string using the optical character recognition model;

computing a hash value of the current string;

storing the current string and the hash value of the current string into a first preset tree structure;

predicting a new probability value of the current string at a next moment;

storing the hash value of the current string into a second preset tree structure;

generating, based on the current string, a target character set using the optical character recognition model at the next moment;

extending the current string through the target character set recognized at the next moment, to obtain an extended string set;

for each extended string in the extended string set:

computing a respective probability value and a respective hash value; and storing the respective probability value and the respective hash value into the second preset tree structure;

selecting N strings with one or more highest probability values from the first preset tree structure according to the hash values stored in the second preset tree structure, N being an integer not less than 1; and using the N strings as current strings, repeating the foregoing steps to obtain a target string with a highest probability value as a final recognition result.

14. The non-transitory computer-readable storage medium according to claim 13, wherein:

the obtaining a current string comprises obtaining the current string formed by characters whose recognition probability is greater than a preset probability; and the computing a hash value of the current string comprises obtaining the hash value of the current string while recognizing text for the acquired image through the optical character recognition model.

15. The non-transitory computer-readable storage medium according to claim 14, wherein the predicting a new probability value of the current string at a next moment, and storing the hash value of the current string into a second preset tree structure comprises:

predicting a predicted character of the current string at the next moment;

obtaining a combined probability of the current string and the predicted character as the new probability value; and storing the hash value of the current string into the second preset tree structure, wherein the second preset tree structure is a set structure.

16. The non-transitory computer-readable storage medium according to claim 13, wherein the extending the current string through the target character set to obtain an extended string set comprises:

obtaining characters whose recognition probability is greater than a preset probability and recognized at the next moment to form the target character set; and combining the current string with each character in the target character set to obtain all combined strings as the extended string set.

17. The non-transitory computer-readable storage medium according to claim 16, wherein the selecting N strings with one or more highest probability values from the first preset tree structure according to the hash value stored in the second preset tree structure comprises:

determining N hash values with one or more highest probability values from the second preset tree structure according to the new probability value of the current string and the respective probability value of each extended string; and determining the N strings corresponding to the N hash values from the first preset tree structure according to the N hash values.

18. The non-transitory computer-readable storage medium according to claim 13, wherein the first preset tree structure is a set structure.

* * * * *